E. A. BRACE.
ENGINE STARTER.
APPLICATION FILED NOV. 8, 1916.
1,284,052.
Patented Nov. 5, 1918.
2 SHEETS—SHEET 1.
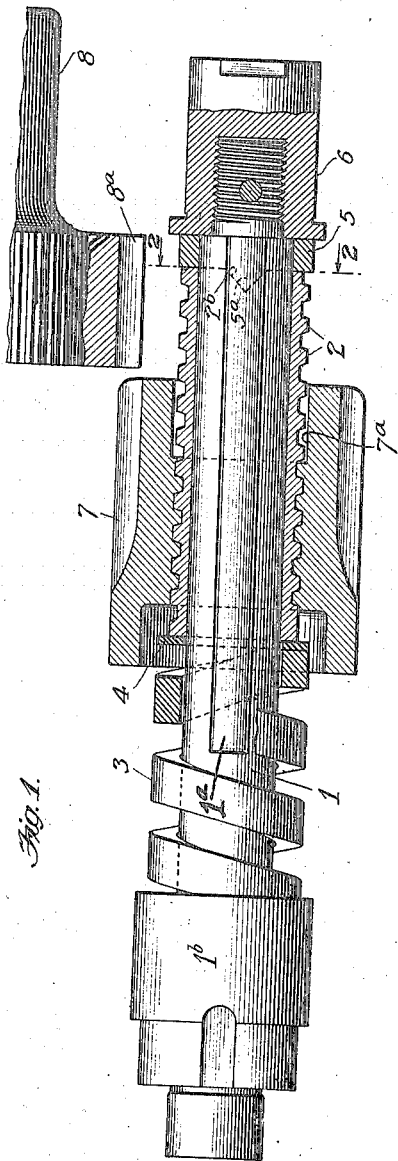
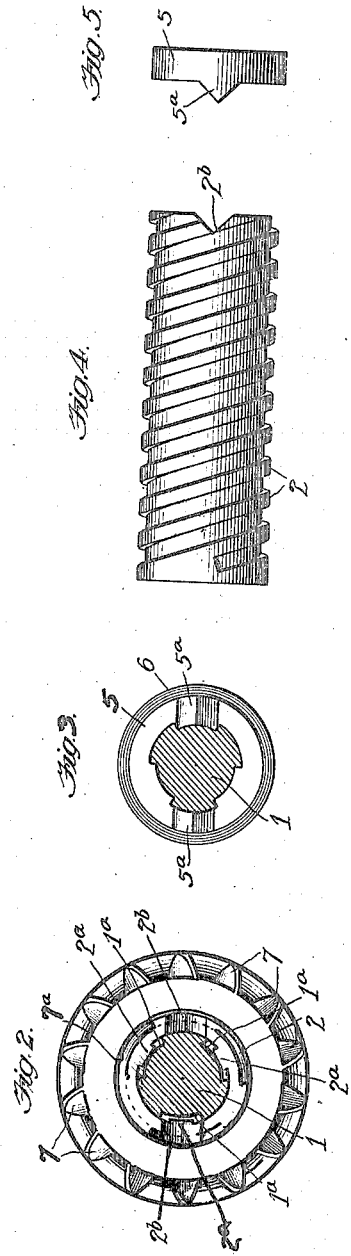

E. A. BRACE.
ENGINE STARTER.
APPLICATION FILED NOV. 8, 1916.
1,284,052.
Patented Nov. 5, 1918.
2 SHEETS—SHEET 2.
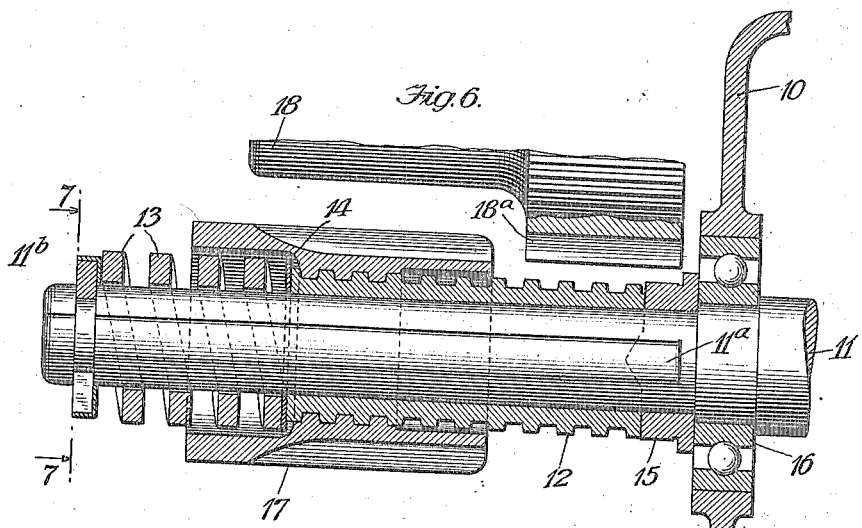
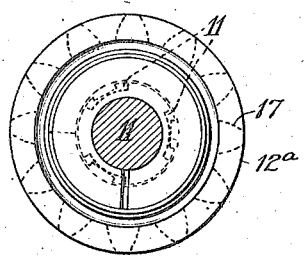
WITNESSES:
Martin H. Olsen.
Robert Dobberman
INVENTOR.
Elwer A. Brace
BY Rector, Kibben, Davis & Macauley
His ATTORNEYS.

UNITED STATES PATENT OFFICE.

ELMER A. BRACE, OF ELMIRA, NEW YORK, ASSIGNOR TO ECLIPSE MACHINE COMPANY, OF ELMIRA, NEW YORK, A CORPORATION OF NEW YORK.

ENGINE-STARTER.

1,284,052.

Specification of Letters Patent.

Patented Nov. 5, 1918.

Application filed November 8, 1916. Serial No. 130,224.

*To all whom it may concern:*

Be it known that I, ELMER A. BRACE, a citizen of the United States, residing at Elmira, in the county of Chemung and State of New York, have invented certain new and useful Improvements in Engine-Starters, of which the following is a specification.

My invention relates to a starter for an engine such as a gas engine, and the object thereof is to provide a simple, efficient and reliable device of this character to be operated by a prime mover of any kind, such for instance as an electric motor.

My starter embodies as a material part of its organization that type of drive or transmission exemplified in patents heretofore issued to Vincent Bendix, for instance Patent No. 1,125,935, dated January 26, 1915, and Patent No. 1,172,864, dated February 22, 1916. This type of engine starter is characterized by a prime mover, such as an electric motor, and a transmission or drive for transmitting the power of the motor by means of a rotatable member, such as a screw shaft, and a driving member such as a pinion mounted thereon, for transmitting the power of the motor to some member or part of the engine to be started, such as the fly-wheel thereof.

The object of my present invention is to provide a simple and efficient drive differing in construction as compared with the drive of the patents aforesaid but embodying and operating on the same principle. The device is particularly constructed and designed to provide a yielding movement of the screw shaft and pinion in case the teeth of the pinion and fly-wheel abut end to end and also to provide for a yielding longitudinal movement of the shaft to take care of different degrees of resistance caused by the motor going over compression points.

In the drawings Figure 1 is a sectional elevation of a drive embodying my invention; Fig. 2 a section on the line 2—2, looking in the direction of the arrows pointing to the left; Fig. 3 a section on the same line but looking in the opposite direction; Fig. 4 an elevation of the hollow screw shaft; Fig. 5 an elevation of a washer coöperating with the screw shaft; Fig. 6 a section of a modified form of construction, and Fig. 7 a sectional elevation on the line 7—7 of Fig. 6.

Referring to that form of drive illustrated in Figs. 1 to 5, the driving shaft 1 may be an extended shaft of the armature of an electric motor or as herein shown may be a separate shaft connected in suitable manner to one end of the armature shaft. The screw shaft 2 is in the form of a hollow sleeve which is splined to the driving shaft 1 so as to have both rotary movement therewith and longitudinal movement thereof. As shown, the shaft 1 is provided with a series of longitudinal grooves $1^a$ and the inner bore of the screw shaft is provided with splines or feathers $2^a$. This hollow screw shaft is held in outward position toward the right, in Fig. 1, with a yielding pressure by means of the coiled spring 3, one end of which bears against the outer face of the driving head $1^b$ of the shaft 1 and the other against the inner end of the screw shaft, a washer 4 being preferably interposed in such latter place. This spring thus holds the screw shaft toward the right against a washer 5 interposed between the outer end of such shaft and the stop nut 6, which by preference is both screwed into and pinned to the outer end of the driving shaft, as clearly shown in Fig. 1. The washer 5 is preferably provided with opposite inverted V-shaped projections $5^a$ adapted to be received by corresponding V-shaped notches $2^b$ in the outer end of the screw shaft 2. The pinion 7 has a screw threaded central bore whereby it is screw threaded upon the screw shaft 2 but such bore is relieved at its outer portion as at $7^a$, that is it is not provided at such portion with screw threads, but is counter-bored thereat in order that the pinion may pass over the washer 5 and come into contact with the stop nut 6.

Describing the operation, when the electric motor is started and the driving shaft 1 is thereby rotated the screw shaft is correspondingly rotated, with the result that the pinion 7 will be advanced or moved longitudinally and outwardly toward the right, Fig. 1, and into mesh with the teeth $8^a$ of the fly-wheel 8 or other rotary part of the engine to be started. In the event that the teeth of the pinion 7 and of the fly-wheel 8 should not be in register but should abut end to end, the pressure is relieved or cushioned by a slight yielding movement of the screw shaft to the left, Fig. 1, against the tension of the spring 3, whereupon the pinion will rotate slightly so as to bring about register between said teeth, with the result that full meshing will be accomplished when the pinion comes into contact with the stop nut. At this time the pinion will rotate with the screw shaft and driving shaft and will rotate the fly-wheel. When the engine starts on its own power the increased speed of rotation of the fly-wheel will cause the pinion to be moved to the left out of mesh and back to the home position shown in Fig. 1, such pinion coming to rest and being stopped by the ends of the threads on the screw shaft. Any shock that there may be at this time is cushioned by the spring and likewise any shock of contact between the pinion and the stop nut 6 is also cushioned by that spring.

When the gas engine goes over the compression points different degrees of resistance are presented to the pinion 7 as a driving member and instead of the pinion rotating slightly on the screw shaft and thereby vibrating when the engine goes over these compression points, the pinion remains in full mesh but the screw shaft will yield slightly longitudinally against the tension of the heavy spring 3.

The form shown in Fig. 1 is what is known as the outboard type of drive, inasmuch as the pinion 7 moves outwardly from the electric motor when going into mesh with the fly-wheel, but my invention is equally applicable to what is known as the inboard type of drive, in which the pinion in going into mesh with the fly-wheel moves inwardly of the screw-shaft, that is toward the electric starting motor. In Figs. 6 and 7 I have illustrated my invention as embodied in such inboard type of drive, the general construction and mode of operation, however, being the same.

Referring to Figs. 6 and 7, the motor whose casing is indicated at 10 has a driving shaft 11 on which is mounted for both rotary and longitudinal movement a hollow screw shaft 12 in the form of a sleeve. This screw shaft is splined to the driving shaft, in the present instance the driving shaft being provided with a series of longitudinal grooves 11ᵃ and the screw shaft with splines or feathers 12ᵃ. The screw shaft is held in normal position by means of the coiled spring 13 surrounding the outer end of the driving shaft 11 and bearing respectively against a split washer 11ᵇ inserted in a groove at the outer end of that shaft and bearing at the other end against the outer end of the screw shaft through the medium of the interposed washer 14. A washer 15 similar to the washer 5 is interposed between the inner end of the screw shaft and the bearings 16 in the motor casing. The pinion 17 is substantially the same as pinion 7 and adapted to mesh with the teeth 18ᵃ of the fly-wheel 18. The mode of operation of this modified form of construction is the same as that of the first form with the exception that the advance movement of the pinion in going into mesh with the fly-wheel is toward the starting motor rather than in the other direction.

I claim:

1. In a device of the character described, the combination of a rotatable driving member, a hollow member mounted thereon, said two members being unyieldingly connected to each other for rotary movement in unison and for longitudinal movement one upon the other, and a driving element adapted to engage a member of the engine to be started and mounted upon said hollow member for rotary movement therewith and longitudinal movement thereon whereby rotation of said rotatable driving member advances said driving element from a position of non-engagement to one of engagement with said engine member.

2. In a device of the character described, the combination of a rotatable driving member, a hollow member mounted thereon, said two members being unyieldingly connected to each other for rotary movement in unison and for longitudinal movement one upon the other, a driving element adapted to engage a member of the engine to be started and mounted upon said hollow member for rotary movement therewith and longitudinal movement thereon whereby rotation of said rotatable driving member advances said driving element from a position of non-engagement to one of engagement with said engine member and yielding means for holding said first two mentioned members in a normal position with respect to their relative longitudinal movement.

3. In a device of the character described, the combination of a rotatable driving member, a hollow member mounted thereon, said two members being unyieldingly connected to each other for rotary movement in unison and for longitudinal movement one upon the other, a driving element adapted to engage a member of the engine to be started and mounted upon said hollow member for rotary movement therewith and longitudinal movement thereon whereby rotation of said rotatable driving member advances said driving element from a position of non-engagement to one of engagement with said engine member, and a spring coöperating with the two first named members for holding them in a normal position with respect to their relative longitudinal movement.

4. In a device of the character described, the combination of a rotatable driving member, a hollow member mounted thereon, said two members being operatively interlocked for rotary movement in unison and a driving element adapted to engage a member of the engine to be started and mounted on said hollow member for rotary movement therewith and longitudinal movement thereof.

5. In a device of the character described, the combination of a rotatable driving shaft, a hollow screw shaft mounted thereon, said two shafts being operatively interlocked for rotary movement in unison, and a driving element adapted to engage a member of the engine to be started and screw-threaded upon the hollow shaft for rotary movement therewith and longitudinal movement thereof whereby rotation of said driving shaft advances said driving element from a position of non-engagement to one of engagement with said engine member.

6. In a device of the character described, the combination of a rotatable driving shaft, a hollow screw-shaft splined thereon for rotary movement therewith and longitudinal movement thereon, and a pinion adapted to engage a member of the engine to be started and screw-threaded on the screw shaft for rotary movement therewith and longitudinal movement thereon whereby rotation of said driving shaft advances said pinion from a position of non-engagement to one of engagement with said engine member.

7. In a device of the character described, the combination of a rotatable driving shaft, a hollow screw shaft splined thereon for rotary movement therewith and longitudinal movement thereon, means for stopping the longitudinal movement thereof in one direction, and a pinion adapted to engage a member of the engine to be started and screw threaded on the screw shaft for rotary movement therewith and longitudinal movement thereon whereby rotation of said driving shaft advances said pinion from a position of non-engagement to one of engagement with said engine member.

8. In a device of the character described, the combination of a rotatable driving shaft, a hollow screw shaft splined thereon for rotary movement therewith and longitudinal movement thereon, means for holding the screw shaft in a normal position longitudinally with a yielding pressure, and a pinion adapted to engage a member of the engine to be started and screw threaded on the screw shaft for rotary movement therewith and longitudinal movement thereon whereby rotation of said driving shaft advances said pinion from a position of non-engagement to one of engagement with said engine member.

9. In a device of the character described, the combination of a rotatable driving shaft, a hollow screw shaft splined thereon for rotary movement therewith and longitudinal movement thereon, a spring acting on the screw shaft to normally hold it in extreme position longitudinally in one direction, and a pinion adapted to engage a member of the engine to be started and screw threaded on the screw shaft for rotary movement therewith and longitudinal movement thereon whereby rotation of said driving shaft advances said pinion from a position of non-engagement to one of engagement with said engine member.

10. In a device of the character described, the combination of a rotatable driving shaft, a hollow screw shaft splined thereon for rotary movement therewith and longitudinal movement thereon, a coiled spring surrounding a portion of the driving shaft and bearing at one end against such driving shaft and at the other end against the screw shaft, and a pinion screw threaded on the screw shaft for rotary movement therewith and longitudinal movement thereon.

11. In a device of the character described, the combination of a rotatable driving shaft, a hollow screw shaft splined thereon for rotary movement therewith and longitudinal movement thereon, a washer held in fixed position on the driving shaft, means for pressing the screw shaft against the washer with a yielding pressure, and a pinion screw threaded on the screw shaft for rotary movement therewith and longitudinal movement thereon.

12. In a device of the character described, the combination of a rotatable driving shaft, a hollow screw shaft splined thereon for rotary movement therewith and longitudinal movement thereon, a washer held in fixed position on the driving shaft, means for pressing the screw shaft against the washer with a yielding pressure, and a pinion screw threaded on the screw shaft for rotary movement therewith and longitudinal movement thereon, the screw shaft and washer having engaging members.

13. In a device of the character described, the combination of a rotatable driving shaft, a hollow screw shaft splined thereon for rotary movement therewith and longitudinal movement thereon, a washer held in fixed position on the driving shaft, means for pressing the screw shaft against the washer with a yielding pressure, and a pinion screw threaded on the screw shaft for rotary movement therewith and longitudinal movement thereon, the screw shaft and washer having connection through V-shaped projections and corresponding shaped notches.

14. In a device of the character described, the combination of a rotatable driving shaft, a hollow screw shaft splined thereon for rotary movement therewith and longitudinal movement thereon, a washer held in fixed position on the driving shaft, means for pressing the screw shaft against the washer with a yielding pressure, and a pinion screw threaded on the screw shaft for rotary movement therewith and longitudinal movement thereon, the screw threaded bore of the pinion being relieved at one end to pass over the washer.

15. In a device of the character described, the combination of a rotatable driving shaft, a hollow screw shaft splined thereon for rotary movement therewith and longitudinal movement thereon, a washer held in fixed position on the driving shaft, means for pressing the screw shaft against the washer with a yielding pressure, a stop nut which is located at one end of the driving shaft and against which the washer bears, and a pinion screw threaded on the screw shaft for rotary movement therewith and longitudinal movement thereon.

ELMER A. BRACE.